Aug. 13, 1946.   J. W. BRANNIN   2,405,814
ECHO BOX RESONANCE TESTER
Filed May 16, 1945

INVENTOR.
JAMES W. BRANNIN
BY Ralph L. Chappell
ATTORNEY

Patented Aug. 13, 1946

2,405,814

UNITED STATES PATENT OFFICE 2,405,814

ECHO BOX RESONANCE TESTER

James W. Brannin, Cambridge, Mass., assignor, by mesne assignments, to the Government of the United States of America as represented by the Secretary of the Navy Application May 16, 1945, Serial No. 594,079

8 Claims. (Cl. 177—311)

This invention relates in general to ultra-high frequency cavity resonators and echo boxes and in particular to a method of using a neon lamp coupled to such a cavity or box to give an indication when the cavity or box is tuned to resonance for a particular frequency under consideration.

In general, any space completely enclosed within a conductive envelope of whatever shape will act as a very highly efficient resonant tuned circuit at some frequency or frequencies, but the shapes of resonators most commonly used for frequency measuring devices are those possessing symmetry because of the greater facility of calculating the resonant frequency in these cases.

Energy from a source whose frequency is to be measured or reproduced may be introduced into a cavity either by inserting into the cavity a loop which may be considered to provide coupling mainly with the magnetic field within the cavity, or by inserting within the cavity a straight or curved rod which acting as a small antenna may be considered to provide coupling mainly with the electric field within the cavity.

In order to utilize such cavities as echo boxes to receive energy efficiently at a particular frequency and resonant thereat so as to thereafter give out oscillatory energy, it is necessary to tune the cavity to resonance. The tuning adjustment may be by movement of a piston to alter the volume of the cavity, or by introducing variable capacitance at the point of highest electric field or by varying the position of a metal slug within the cavity.

Whenever by either of the above methods the cavity is tuned to resonance at the frequency of the energy being introduced into the cavity standing waves of maximum amplitude will result. It is desirable to have a means of knowing when this has been accomplished.

It is therefore the object of this invention to provide a visible indication when the cavity is tuned to resonance.

It is another object of the invention to provide a neon lamp and means coupling the same to a cavity to energize the lamp when the cavity is tuned to resonance.

These and other objects will be apparent from the following specification when taken with the accompanying drawing, illustrating forms of the invention.

Figure 1:
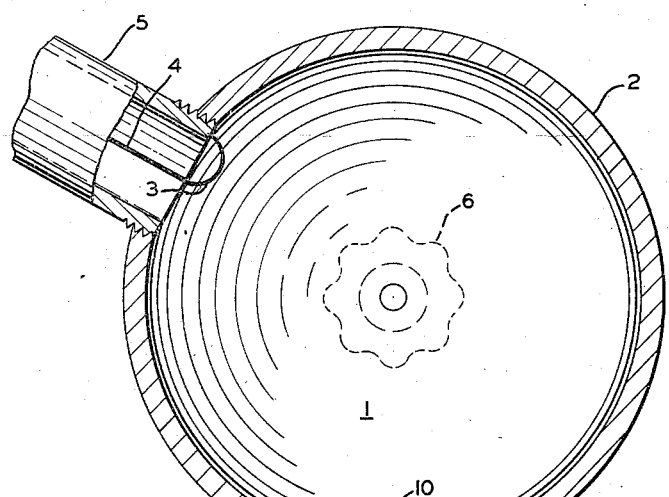
Fig. 1 shows partly in section one embodiment and application of the principles of the invention.

In Fig. 1, a conventional cylindrical resonant cavity 1 is shown enclosed within cylindrical member 2. Energy is introduced into the cavity 1 by means of a loop 3 in the center conductor 4 of a coaxial line having outer conductor 5. Diagrammatically suggested is a manual tuning knob 6 whose function is to vary the resonant frequency of the cavity 1 in the manner described above.

To provide indication of when resonance has been achieved by tuning, a low power neon bulb 7, having electrodes 8 and 9, is caused to glow by energy extracted from the cavity by loop 10 formed in the conductor 11, connected to electrode 9. Equally good results are achieved by leaving the other electrode 8 unconnected or "floating." This makes it unnecessary to solder or otherwise connect the electrode 8 to the outer conductor. Neon tubes usually have two electrodes but a special tube with only one electrode could be employed here. The other end of the loop 10 is conductively connected to the wall of the cavity 1. Instead of using a loop 10, other conventional coupling such as a straight or curved probe might be used.

The neon bulb 7 is positioned inside a metallic cylindrical shield 12 which is closed at the end 13. A window 14 is provided in the shield 12 at the location of the bulb to permit observation of the glow. The shield 12 is conductively attached to the wall 2 of the cavity 1. It is believed that the presence of the shield 12 effects a concentration of field in the vicinity of the bulb 7 causing it to glow much more readily than with any other method of coupling.

The electrical distance from the end of the loop 10 to the end of the bulb electrode 9 is about a half wave length or multiple thereof. To obtain in manufacture the precise length from loop 10 to the bulb 14 which will produce maximum glow or resonance respose it is necessary to prune the lead or conductor 11 for the purpose of adjusting the length of this conductor.

Figure 2:
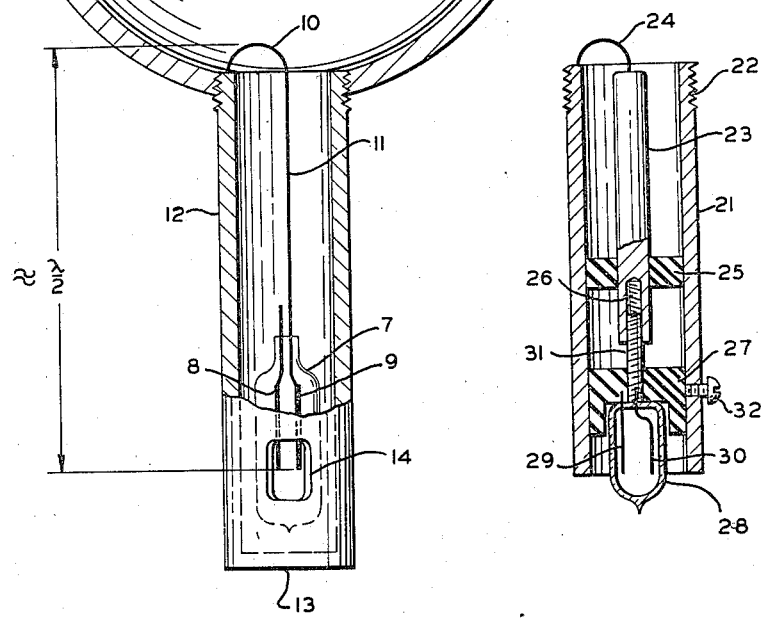
Fig. 2 shows partly in section an alternative embodiment.

Fig. 2 shows an alternative form of the invention in which the exact adjustment of the length of the lead between cavity and neon bulb is accomplished by use of a "line stretcher" so called. In this form there is a metallic cylindrical tube 21 with threads 22 at one end adapted to conductively secure the tube 21 to a cavity resonator such as the one shown in Fig. 1. Located along the axis of the tube 21 is a lead conductor 23 with a conventional coupling loop 24 thereon suitable for extracting energy from such a cavity, the end of the loop being returned to attach conductively to the tube 21. The axial conductor 23 is supported within tube 21 by an insulating spacing bushing 25 of some suitable material such as polystyrene. The outer end of conductor 23 has a threaded bore 26.

Inserted into the outer end of the tube 21 is an insulating member 27, of some suitable material such as polystyrene, hereinafter referred to as a piston, of circular cross section and having a cup shaped cavity into which is affixed a low power neon glow tube 28 having two electrodes 29 and 30. This piston 27 is free to rotate within the tube 21 and free to be moved axially along it.

The electrode 29 is left unconnected or "floating" as in the case of Fig. 1. The electrode 30 is conductively connected to a threaded shaft 31 which is itself threaded into the internal thread of bore 26 so as to be moved axially within the tube 21 when caused to rotate. This threaded shaft 31 is mechanically attached to the piston 27. Hence when the neon bulb 28 is manually rotated, piston 27 rotates with it causing shaft 31 to rotate also, and thereby move axially the combination of bulb 28, piston 27 and shaft 31. As shaft 31 moves in or out of the bore 26 the distance from loop 24 to the neon bulb 28 is varied and likewise the total length of the conducting line between the two.

When the length of the coupling lead including conductor 23 and shaft 31 taken together is properly adjusted, piston 27 is fixed in position by tightening a set screw 32 against it through the tube 21.

In the present case as in the case of Fig. 1 when the cavity resonator with which the invention is being used is tuned to resonance, indication is given by maximum brilliance of the neon glow.

While the invention has been described as used in connection with one form of cavity it will be understood that it may be used with any form of cavity and that the location and form of the coupling depends on the mode of excitation of the cavity.

What is claimed is:

1. A glow tube visual resonance indicating device for use in connection with a tunable cavity resonator comprising a low power glow tube having two electrodes, a tubular metallic shield enclosing said glow tube said shield having one end open and adapted to be conductively attached to the outside wall of a tunable cavity resonator and having the other end closed, and a window in the vicinity of the glow tube, one of the said electrodes floating and the other of said electrodes being extended from the tube along the axis of said shield toward the open end and having a loop at the extremity thereof to be introduced into a cavity resonator for extracting energy therefrom, said electrode together with its extension being in length about one-half wave length, or multiple thereof.

2. A glow tube visual resonance indicating device for use in connection with a cavity resonator comprising a glow tube having two electrodes, a tubular metallic shield enclosing said glow tube said shield having one end open and adapted to be conductively attached to the outside wall of a cavity resonator and having the other end closed, and a window in the vicinity of the glow tube, one of said electrodes being extended along the axis of said shield toward the open end and being adapted to be introduced into a cavity resonator for extracting energy therefrom said electrode together with its external extension being about one-half wave length in length, or multiple thereof.

3. In an echo box system a glow tube visual resonance indicating device comprising a glow tube having an electrode with an external extension, a tubular metallic shield enclosing said glow tube said shield having one end open and adapted to be conductively attached to the outside wall of an echo box and having the other end closed and having a window in the vicinity of the globe tube, said electrode being extended along the axis of said shield and adapted to be introduced into said echo box for extracting energy therefrom.

4. A glow tube visual resonance indicating device for use in connection with a cavity resonator or wave guide comprising a low power glow bulb, having at least one electrode, an open ended metallic tube having one end adapted to be conductively attached to the outer wall of a cavity resonator, a coaxially located conductor having a coupling loop at one extremity adapted for extracting energy from a cavity resonator and at the other extremity thereof an internal threaded axial bore, an insulating spacing bushing supporting said conductor within said tube, an insulating and spacing piston near the outer end of said tube for supporting said bulb, and a threaded metallic shaft coaxially located in said tube and being adapted to engage operatively said threaded bore, said shaft being conductively connected to an electrode in said bulb and being mechanically attached to said piston so as to cause axial movement when said bulb and piston are manually rotated, whereby the electrical distance between said coupling loop and said bulb electrode is made adjustable.

5. A glow tube visual resonance indicating device comprising a low power glow bulb, coaxial coupling means adapted for extracting energy from a resonant cavity, and line stretching means associated with the inner conductor of said coaxial coupling means, whereby the length thereof is made adjustable.

6. A glow tube visual resonance indicating device comprising a glow bulb having at least one electrode, and means for coupling said bulb to a resonant cavity, the inner conductor of said coupling means being adjustable in length, and the outer conductor being in the form of a metallic tubular shield.

7. A glow tube visual resonance indicating device comprising a glow bulb having at least one electrode, and means for coupling said bulb to a resonant cavity, the inner conductor of said coupling means being adjustable in length and being connected to an electrode of said bulb, and the outer conductor being in the form of a metallic tubular shield surrounding said bulb.

8. A glow tube visual resonance indicating device comprising a glow bulb having at least one electrode, and means for coupling said bulb to a resonant cavity, the inner conductor of said coupling means being adjustable in length and being connected to an electrode of said bulb, and the outer conductor being in the form of a metallic tubular shield surrounding said bulb, and a window in the vicinity of said bulb.

JAMES W. BRANNIN.